(12) United States Patent
Ochiai et al.

(10) Patent No.: US 8,376,502 B2
(45) Date of Patent: Feb. 19, 2013

(54) METHOD AND APPARATUS FOR GENERATING COLOR SEPARATION TABLE, AND IMAGE FORMING APPARATUS

(75) Inventors: Takashi Ochiai, Machida (JP); Takuya Shimada, Kawasaki (JP); Hiromitsu Nishikawa, Tokyo (JP); Takayuki Jinno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 13/143,334

(22) PCT Filed: Feb. 8, 2010

(86) PCT No.: PCT/JP2010/052122
§ 371 (c)(1),
(2), (4) Date: Jul. 5, 2011

(87) PCT Pub. No.: WO2010/109973
PCT Pub. Date: Sep. 30, 2010

(65) Prior Publication Data
US 2011/0267394 A1 Nov. 3, 2011

(30) Foreign Application Priority Data
Mar. 25, 2009 (JP) .................................. 2009-075144

(51) Int. Cl.
*B41J 29/393* (2006.01)
(52) U.S. Cl. .......................................................... 347/19
(58) Field of Classification Search ........................ None
See application file for complete search history.

(56) References Cited

U.S. PATENT DOCUMENTS

| 4,313,124 A | 1/1982 | Hara .............................. 346/140 |
| 4,345,262 A | 8/1982 | Shirato et al. ................. 346/140 |
| 4,459,600 A | 7/1984 | Sato et al. ..................... 346/140 |
| 4,463,359 A | 7/1984 | Ayata et al. ..................... 346/1.1 |
| 4,558,333 A | 12/1985 | Sugitani et al. ............... 346/140 |

(Continued)

FOREIGN PATENT DOCUMENTS

| EP | 1 391 301 | 2/2004 |
| JP | 59-123670 | 7/1984 |

(Continued)

OTHER PUBLICATIONS

U.S. Appl. No. 13/208,274, filed Aug. 11, 2011 by Takuya Shimada.

*Primary Examiner* — Stephen Meier
*Assistant Examiner* — Tracey McMillion
(74) *Attorney, Agent, or Firm* — Fitzpatrick, Cella, Harper & Scinto

(57) ABSTRACT

The relationship between the applying amounts of colored inks and the thickness of the layer of a color material formed on a recording medium, and the relationship between the applying amount of uncolored ink and the thickness of the layer of the color material formed on the recording medium are acquired. Based on the relationships between the applying amounts and the thickness of the layer of the color material, the applying amounts of colored inks and the applying amount of uncolored ink are determined to substantially uniform the thickness of the layer of the color material when forming an image on a recording medium. A color separation table for color-separating image data is generated based on the applying amounts of colored inks and the applying amount of uncolored ink.

8 Claims, 12 Drawing Sheets

U.S. PATENT DOCUMENTS

| | | | |
|---|---|---|---|
| 4,723,129 A | 2/1988 | Endo et al. | 346/1.1 |
| 4,740,796 A | 4/1988 | Endo et al. | 346/1.1 |
| 6,877,850 B2 | 4/2005 | Ishimoto et al. | 347/100 |
| 7,003,151 B2 | 2/2006 | Shimada | 382/162 |
| 7,420,705 B2 | 9/2008 | Yamada et al. | 358/1.9 |
| 7,450,281 B2 | 11/2008 | Torigoe et al. | 358/523 |
| 7,453,602 B2 | 11/2008 | Shimada | 358/1.9 |
| 7,755,795 B2 | 7/2010 | Shimada | 358/1.9 |
| 7,791,760 B2 | 9/2010 | Shimada | 358/1.9 |
| 8,027,058 B2 | 9/2011 | Jinno | 358/1.9 |
| 2004/0109989 A1 | 6/2004 | Konno et al. | 428/195.1 |
| 2007/0291311 A1 | 12/2007 | Yano et al. | 358/2.1 |
| 2008/0299315 A1 | 12/2008 | Iwase et al. | 427/265 |
| 2010/0245873 A1 | 9/2010 | Shimada | 358/1.9 |
| 2011/0194760 A1 | 8/2011 | Ochiai et al. | 382/164 |
| 2011/0242556 A1 | 10/2011 | Jinno et al. | 358/1.9 |

FOREIGN PATENT DOCUMENTS

| | | |
|---|---|---|
| JP | 59-138461 | 8/1984 |
| JP | 2005-22218 | 1/2005 |
| JP | 2005-99611 | 4/2005 |
| JP | 2006-15691 | 1/2006 |
| JP | 2006-192322 | 7/2006 |
| JP | 2006-272934 | 10/2006 |
| JP | 2007-276482 | 10/2007 |

METHOD AND APPARATUS FOR GENERATING COLOR SEPARATION TABLE, AND IMAGE FORMING APPARATUS

TECHNICAL FIELD

The present invention relates to a method and apparatus for generating a color separation table used by an image forming apparatus that applies colored inks and an uncolored ink (to be referred to as a clear ink) to form an image, and an image forming apparatus.

BACKGROUND ART

Various methods have been proposed for recording apparatuses that record a text, image, and the like on recording paper or sheet-like recording media such as a film. A typical example is an inkjet method of forming a text and image on a recording medium by applying a recording material (color material) on a recording medium.

Recording apparatuses of the inkjet type (to be referred to as inkjet recording apparatuses) are classified into a serial apparatus that scans a recording head in a recording region vertically and horizontally, and a line-head apparatus that scans, in only one direction, a recording head in which recording elements are arranged fully widthwise in a recording region.

The serial inkjet recording apparatus forms an image on a recording medium by alternately repeating main scanning of moving a carriage supporting a recording head with respect to a recording medium while discharging ink from recording elements, and sub-scanning of carrying a recording medium in a direction perpendicular to the main scanning direction. The serial inkjet recording apparatus generally employs a recording method called multipass recording, and forms an image stepwise by scanning the same region on a recording medium a plurality of number of times.

FIGS. 1A to 1C are schematic views for explaining multipass recording.

FIG. 1A shows the state of a recording medium on which a color material discharged from a recording head 104 is applied by the first scanning. Dots 101 are recorded by the first scanning not to overlap each other.

FIG. 1B shows the state of the recording medium on which a color material is applied after the second scanning. Dots 102 are recorded by the second scanning while overlapping the dots 101.

FIG. 1C shows the state of the recording medium on which a color material is applied after the third scanning. Dots 103 are recorded by the third scanning while overlapping the dots 102.

Recording is completed by the two, first and second scan operations in the upper half region of the recording medium shown in FIGS. 1A to 1C, and by the two, second and third scan operations in the lower half region. The positions of dots to be recorded by each scanning are determined by the AND of image data of an image to be formed and a mask pattern (binary data indicating dot recording positions and non-recording positions in scanning). In the example shown in FIGS. 1A to 1C, the recording ratio of each scanning is 50%. The recording ratio becomes 100% by two scan operations (so-called two passes), forming an image.

In this state example, the dots 101 do not overlap each other, the dots 101 and 102 overlap each other, and the dots 102 and 103 overlap each other. However, overlapping of dots are determined by the dot size, the recording ratio in each scanning, and the recording resolution.

A recording medium is carried between scan operations in multipass recording, so recording elements which record dots in a given region change every scanning. Even if the discharge characteristics of recording elements vary, multipass recording can distribute the influence of variations and make it less conspicuous on a formed image. The density of a recorded portion sometimes changes at the joint between scan operations owing to variations in the recording medium carrying amount, generating a line due to a change in density at the joint. However, multipass recording can obscure the line at the joint in a formed image.

Variations in the discharge characteristics of recording elements and the carrying amount are image deterioration factors arising from the manufacturing process and precision. Thus, multipass recording is an important technique for maintaining the image quality in a serial inkjet recording apparatus.

As an ink for inkjet recording apparatuses, dye ink using a water-soluble dye as a color material is popular. The color material dissolved in a solvent in the dye ink, whose main component is water, easily permeates into the fiber of a recording medium. This makes it easy to maintain the surface shape of a recording medium even after recording an image, and the gloss of the recording medium is kept as that of the image. In other words, a combination of a recording medium and dye ink that has exceptional gloss provides a glossy image. The user of the inkjet recording apparatus using the dye ink can obtain an image with the desired glossiness by selecting a recording medium that has the preferred glossiness.

In contrast, higher light resistance and higher water resistance are requested of printed materials. The dye molecule of the color material of the dye ink is dissolved by light, and the colors of an image readily fade. When a printed material gets wet, the dye molecule permeated in the fiber is dissolved in water, and the image smears readily. That is, a material printed with the dye ink generally suffers low light resistance and water resistance.

To solve poor light resistance and water resistance of a material printed with the dye ink, pigment ink using a pigment as a color material has been developed these days. Unlike the dye ink in which the dye exists as a molecule in a solvent, the color material of the pigment ink exists in a solvent as a particle several ten nm to several hundred nm in diameter. The color material particle of the pigment ink is larger than the dye molecule of the dye ink, and can provide a printed material excellent in light resistance. Since the pigment is insoluble in water, the pigment ink is superior to the dye ink even in water resistance.

In recording with the pigment ink, the pigment particle hardly permeates into a recording medium and piles on the surface of the recording medium. As a result, the fine shape (smoothness) of the image surface differs between a recording region where the pigment ink is applied and a non-recording region where it is not applied.

The amount of color material used changes depending on the density and color of an image formed on a recording medium, and the area by which the pigment covers a recording medium changes. Since the pigment and recording medium have different reflectances, the gloss changes upon a change of the area by which the pigment covers a recording medium.

In this manner, even the glossiness changes depending on the density and color of an image in recording using the pigment ink. As a result, one image has regions different in gloss, that is, a glossy region observed to be glossy and a mat region observed not to be glossy. A change of gloss in one image is recognized as "heterogeneity of glossiness". The heterogeneity of glossiness is often recognized as poor quality particularly on a printed photo image.

To solve this problem, for example, inventions in Japanese Patent Laid-Open Nos. 2006-272934 and 2007-276482 propose methods using a clear ink containing no color material. More specifically, Japanese Patent Laid-Open No. 2006-272934 discloses a technique of adjusting the discharge amounts of color and clear inks to uniform, in the entire unrecorded region of a recording medium, the amount of resinous component derived from pigment ink per unit area in the unrecorded region. Japanese Patent Laid-Open No. 2007-276482 discloses a technique of adjusting the discharge amounts of colored and clear inks to substantially uniform glossiness in an unrecorded region.

The techniques in Japanese Patent Laid-Open Nos. 2006-272934 and 2007-276482 can uniform glossiness. However, depending on the type of ink and printing conditions, specular reflection light from a recorded surface is colorized differently based on the image tone and the color difference may visually stand out. The colorization of specular reflection light is conspicuous especially in a region recorded with a bright ink such as yellow ink or clear ink. The study by the present inventors has revealed that this phenomenon is interference (structural color) by a thin film and the thickness of a color material layer determines the color of specular reflection light.

FIG. 2 is a schematic view for explaining the principle of interference by a thin film.

When an image is formed with pigment ink, part of light is reflected by the surface of a color material layer 1301 formed on a recording medium 1302, and another passes through the color material layer 1301 and is reflected by the surface of the recording medium 1302. These light beams differ in optical path length by a thickness 1303 of the color material layer 1301 and interfere with each other, colorizing specular reflection light. The optical path difference between the two reflection light beams depends on the thickness 1303, so the color of specular reflection light depends on the thickness 1303 of the color material layer 1301.

The tone is expressed by changing the applying amount of colored ink. The change of the amount being applied leads to a change of the thickness 1303 of the color material layer 1301. It will be understood that the color of specular reflection light changes depending on the tone.

DISCLOSURE OF INVENTION

In one aspect, a method of generating a color separation table used by an image forming device that applies colored inks and an uncolored ink on a recording medium to form an image, the method comprising: using a processor to perform the steps of: acquiring a relationship between applying amounts of the colored inks and a thickness of a layer of a color material formed on a recording medium, and a relationship between an applying amount of the uncolored ink and the thickness of the layer of the color material formed on the recording medium; determining, based on the relationships between the applying amounts and the thickness of the layer of the color material, the applying amounts of the colored inks and the applying amount of the uncolored ink to substantially uniform the thickness of the layer of the color material when forming an image on a recording medium; and generating a color separation table for color-separating image data based on the applying amounts of the colored inks and the applying amount of the uncolored ink.

In another aspect, an apparatus for generating a color separation table used by an image forming device that applies colored inks and an uncolored ink on a recording medium to form an image, the apparatus comprising: an acquisition section, configured to acquire a relationship between applying amounts of the colored inks and a thickness of a layer of a color material formed on a recording medium, and a relationship between an applying amount of the uncolored ink and the thickness of the layer of the color material formed on the recording medium; a determiner, configured to determine, based on the relationships between the applying amounts and the thickness of the layer of the color material, the applying amounts of the colored inks and the applying amount of the uncolored ink to substantially uniform the thickness of the layer of the color material when forming an image on a recording medium; and a generator, configured to generate a color separation table for color-separating image data based on the applying amounts of the colored inks and the applying amount of the uncolored ink.

According to these aspects, a structural color in an image formed using colored and uncolored inks can be suppressed.

Further features of the present invention will become apparent from the following description of exemplary embodiments with reference to the attached drawings.

BEST MODE FOR CARRYING OUT THE INVENTION

A method and apparatus for generating a color separation table according to embodiments of the present invention, and an image forming apparatus will be described in detail below with reference to the accompanying drawings. As described above, a clear ink contains no color material in an original sense but a clear resinous component. The following description assumes that the clear ink contains a clear color material serving as a clear resinous component and the correspondence with a colored ink will be simply explained.

First Embodiment

[Apparatus Arrangement]

Figure 1A:
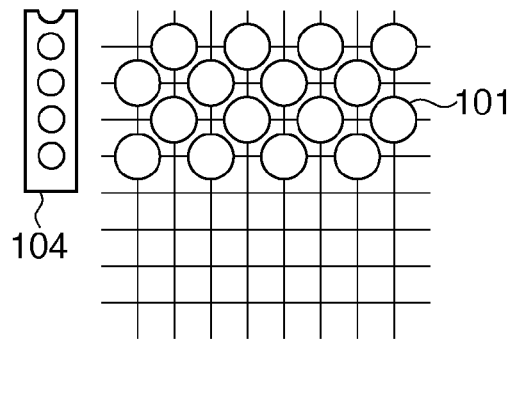
FIGS. 1A to 1C are schematic views for explaining multipass recording.
Figure 1B:
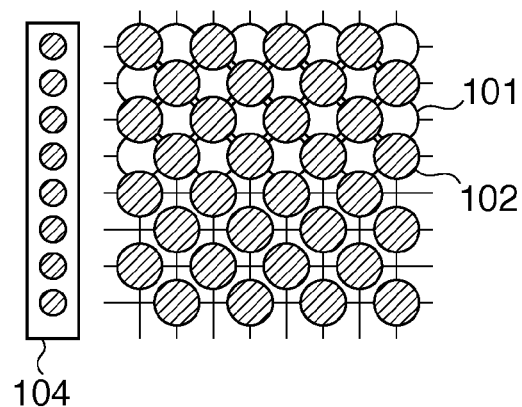
Figure 1C:
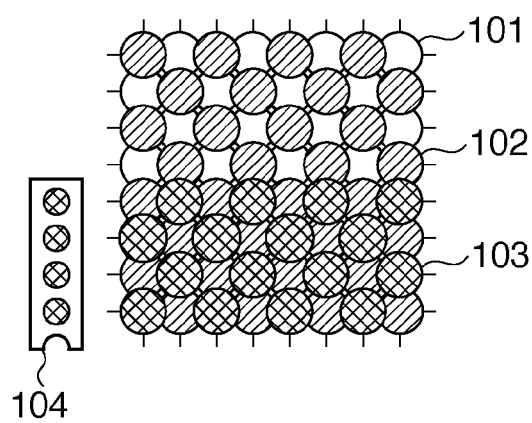
Figure 2:
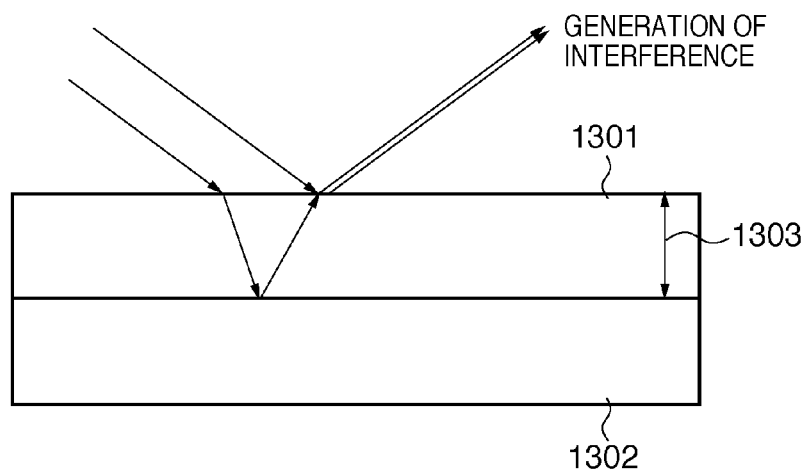
FIG. 2 is a schematic view for explaining the principle of interference by a thin film.
Figure 3:
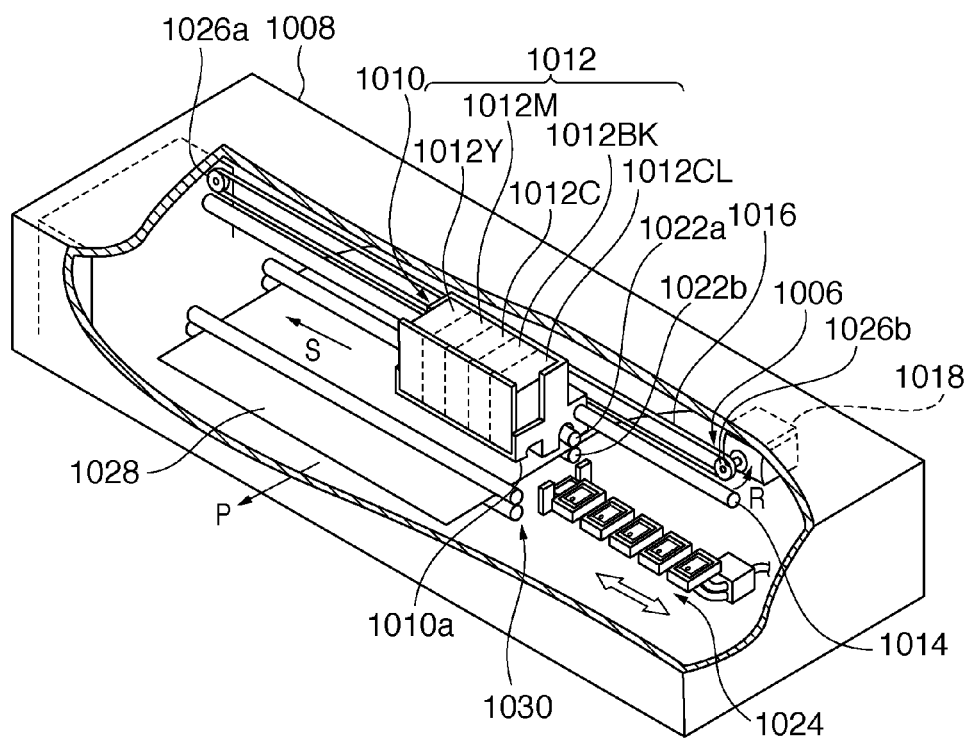
FIG. 3 is a view showing the schematic arrangement of an inkjet recording apparatus according to an embodiment.

FIG. 3 is a view showing the schematic arrangement of an inkjet recording apparatus (to be referred to as a recording apparatus) according to the first embodiment.

A carrying unit 1030 is arranged in the longitudinal direction of a housing 1008 and intermittently carries a recording sheet 1028 in the direction of an arrow P. A moving driving unit 1006 reciprocates a recording unit 1010 along a guide shaft 1014 arranged in the direction of an arrow S perpendicular to the direction P.

The moving driving unit 1006 includes pulleys 1026a and 1026b supported by rotating shafts arranged to face each other at a predetermined interval, a carriage motor 1018 coupled to the shaft of the pulley 1026b, and a belt 1016 looped between the pulleys 1026a and 1026b. The belt 1016 is coupled to a carriage member 1010a of the recording unit 1010. The carriage motor 1018 rotates forward and backward to drive the belt 1016 and freely move the recording unit 1010 forward and backward parallel to roller units 1022a and 1022b.

When the carriage motor 1018 operates to rotate the pulley 1026b in the direction of an arrow R, the belt 1016 follows it to move the recording unit 1010 by a predetermined moving amount in the direction of the arrow S. Also, when the carriage motor 1018 operates to rotate the pulley 1026b in a direction opposite to that of the arrow R, the belt 1016 follows it to move the recording unit 1010 by a predetermined moving amount in a direction opposite to that of the arrow S.

A recovery unit 1024 is arranged at the home position of the carriage member 1010a at one end of the housing 1008 in the longitudinal direction. The recovery unit 1024 is arranged to face the ink orifice array of the recording unit 1010 in order to perform discharge recovery processing for the recording unit 1010.

The recording unit 1010 includes ink cartridges (to be referred to as cartridges) 1012Y, 1012M, 1012C, 1012BK, and 1012CL which store inks of five colors, respectively. The respective cartridges respectively store pigment inks (colored inks) containing pigments of yellow Y, magenta M, cyan C, and black BK and a clear (CL) ink containing a clear color material. The cartridges detachably engage with the carriage member 1010a. An ink contained in each cartridge is supplied to a recording head (not shown) and discharged from it in accordance with image data.

[Arrangement of Control System]

Figure 4:
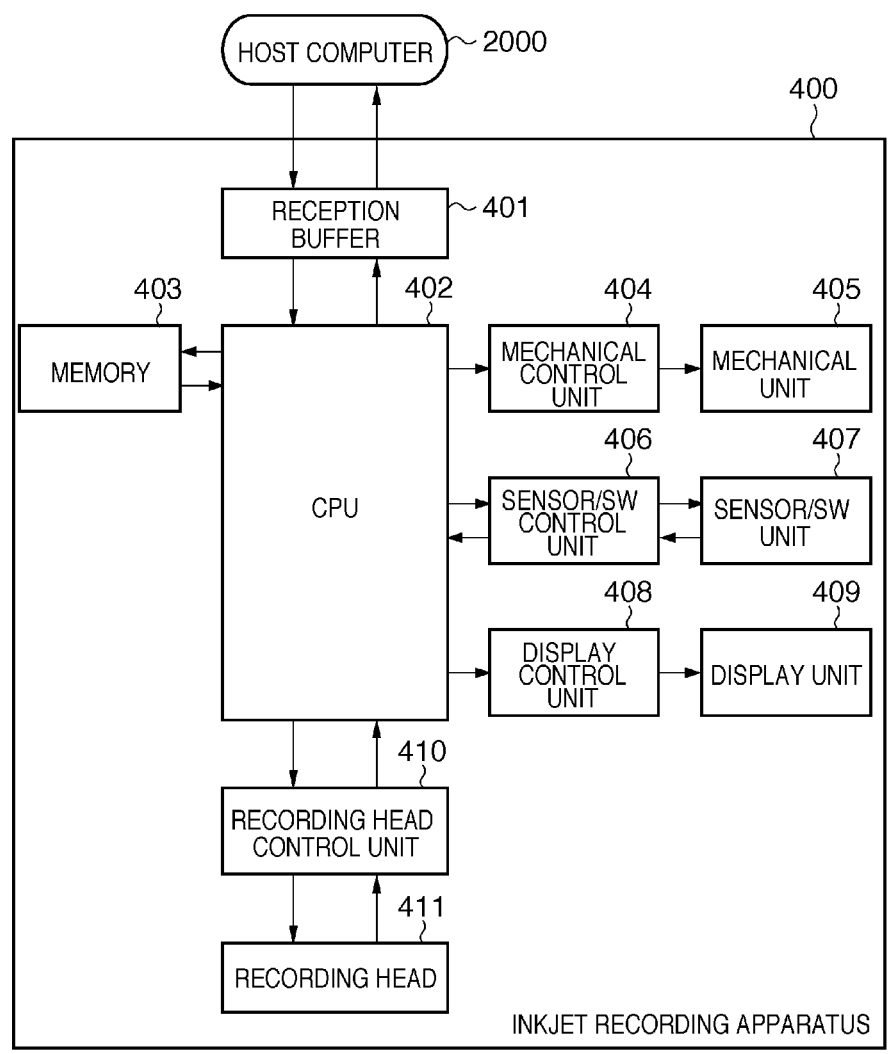
FIG. 4 is a block diagram showing the arrangement of the control system of the recording apparatus.

FIG. 4 is a block diagram showing the arrangement of the control system of the recording apparatus.

A microprocessor (CPU) 402 controls various functions and operations of a recording apparatus 400 using the random access memory area (RAM) of a memory 403 as a work memory in accordance with control programs stored in the nonvolatile memory area of the memory 403.

The recording apparatus 400 is connected via a predetermined interface to a host computer 2000 serving as an external device. A reception buffer 401 receives, for example, image data which is output from the host computer 2000 and represents an image to be printed. The CPU 402 transmits, to the host computer 2000 via the reception buffer 401, a signal indicating whether image data has been received normally and a signal indicating the operating state of the recording apparatus 400.

The CPU 402 temporarily stores data received by the reception buffer 401 in the RAM of the memory 403. The nonvolatile memory area, for example, read only memory (ROM) of the memory 403 stores control programs for a recording operation and discharge recovery processing to be performed by the recording apparatus 400, a color separation table for converting image data into an ink value, a mask pattern for multipass recording, and the like.

Under the control of the CPU 402, a mechanical control unit 404 controls the operation of a mechanical unit 405 made up of the carriage motor 1018, a line feed motor (not shown), and the like. A sensor/SW control unit 406 controls a sensor/SW unit 407 including various kinds of sensors and switch SW under the control of the CPU 402, and transfers a signal received from the sensor/SW unit 407 to the CPU 402.

A display control unit 408 controls display on a display unit 409 formed from an LED, LCD, or the like under the control of the CPU 402. A recording head control unit 410 controls the ink discharge operation of a recording head 411 under the control of the CPU 402, detects the state (e.g., temperature) of the recording head 411, and notifies the CPU 402 of the detected state.

[Recording Head]

Figure 5:
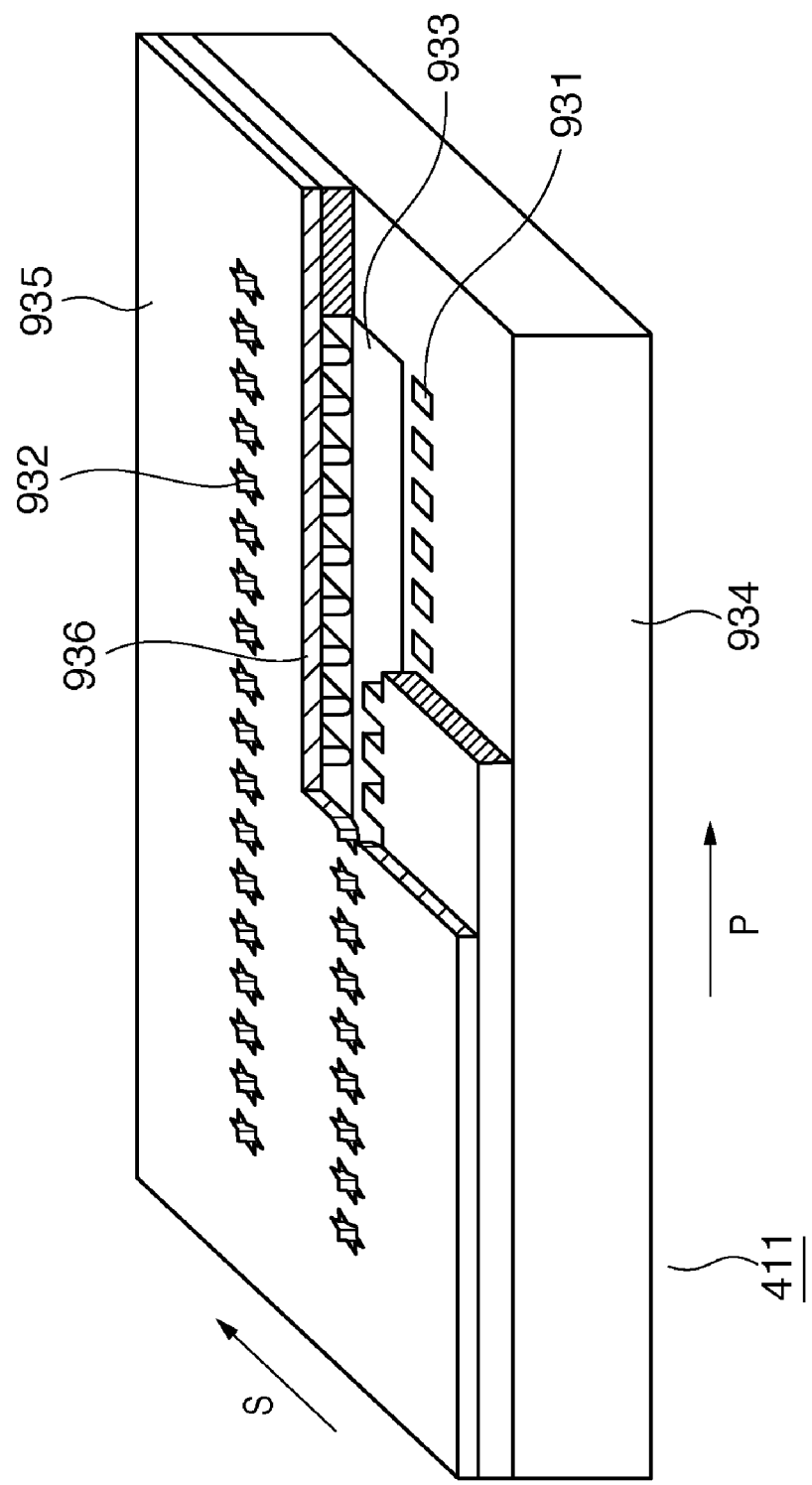
FIG. 5 is a view showing the schematic structure of a recording head for one color.

FIG. 5 is a view showing the schematic structure of the recording head 411 for one color.

The recording head 411 is arranged on a substrate 934 formed from a glass, ceramics, plastic, or metal base. The material of the substrate 934 is not the gist of the present invention and is not particularly limited as long as the substrate 934 functions as part of a channel forming member and also functions as the support of an ink discharge energy generating element and a material layer for forming a liquid channel and orifice (to be described later). In the following example, a silicon (Si) substrate (wafer) is employed as the substrate 934.

Ink orifices 932 are formed on the substrate 934. The ink orifice 932 is formed by irradiating an orifice plate 935 with a laser beam. Alternatively, the ink orifice 932 may be formed by an exposure apparatus such as an MPA (Mirror Projection Aligner) using an orifice plate 935 formed from, for example, a photosensitive resin.

A plurality of electrothermal transducers (to be referred to as heaters) 931 and an ink supply port 933 are arranged on the substrate 934. The ink supply port 933 is an elongated groove-like through port and serves as a common liquid chamber. The heaters 931 are arrayed in a zigzag pattern in line on the two sides of the ink supply port 933 in the longitudinal direction of the ink supply port 933. When the pitch of the heaters 931 arrayed in line is, e.g., 600 dpi, the density of heaters in the zigzag pattern on the two lines is substantially 1,200 dpi.

Ink channel walls 936 are arranged on the substrate 934 to form ink channels. The heater 931 is positioned at the bottom of a space defined by the ink channel walls 936. The ink orifice 932 is positioned on an upper surface facing the bottom where the heater 931 is positioned.

FIG. 5 shows the ink channel walls 936 and orifice plate 935 as separate members. However, the ink channel walls 936 and orifice plate 935 can also be formed simultaneously by forming the ink channel walls 936 on the substrate 934 by a method such as spin coating. The orifice surface (upper surface) of the orifice plate 935 has undergone water-repellent treatment.

Arrows S and P shown in FIG. 5 correspond to the directions S and P shown in FIG. 3 in which the recording unit 1010 and recording sheet 1028 are moved, respectively. More specifically, an image is formed on the recording sheet 1028 at a recording density of, e.g., 1,200 dpi by alternately repeating main scanning of moving the recording head 411 in the direction S while discharging ink from each ink orifice 932, and sub-scanning of carrying the recording sheet 1028 in the direction P.

[Generation of Discharge Table]

Figure 6:
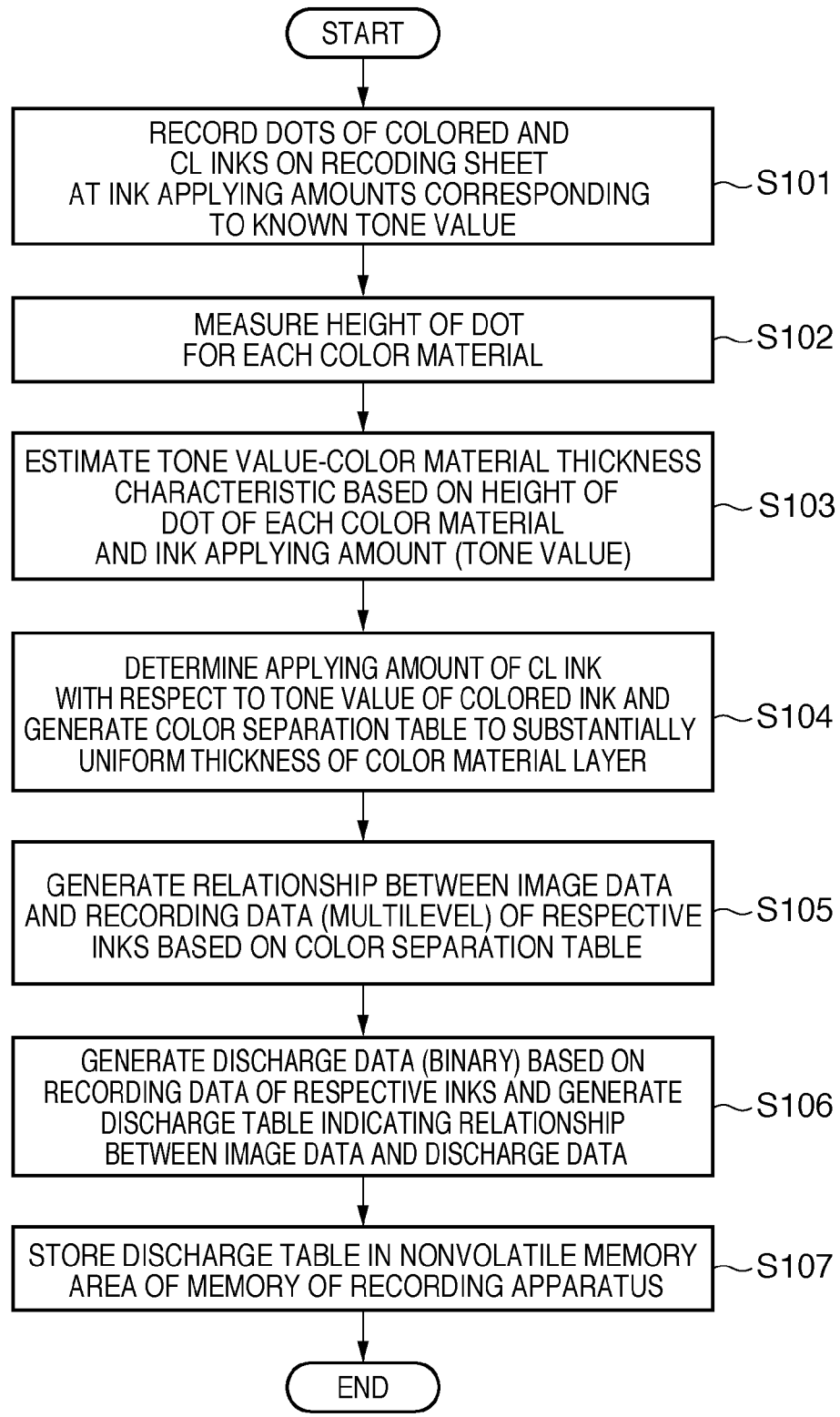
FIG. 6 is a flowchart for explaining procedures of generating a discharge table according to the first embodiment.

FIG. 6 is a flowchart for explaining procedures of generating a discharge table indicating the relationship between image data and the applying amount of ink. The host computer 2000 executes the generation procedures.

The host computer 2000 controls the recording apparatus 400 to form, on the recording sheet 1028, dots of colored and CL inks at ink applying amounts corresponding to a known tone value (S101).

Figure 7:
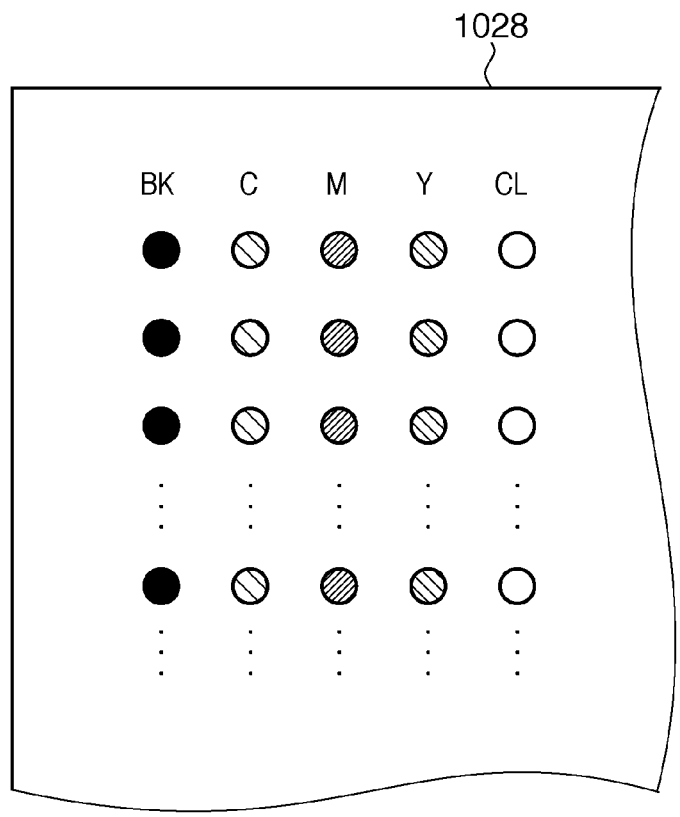
FIG. 7 is a view exemplifying dots formed with respective inks.

FIG. 7 is a view exemplifying dots formed with respective inks. When forming dots, a sufficient distance is ensured between dots so that the height of the dot (thickness of the color material layer) can be measured and dots do not contact each other. A plurality of dots are formed for each ink to enhance the reliability of height measurement.

The host computer 2000 designates measurement of the height of a dot formed on the recording sheet 1028 for each color material (S102). More specifically, the host computer 2000 receives a measurement result from a surface measuring instrument (not shown) connected to the host computer 2000.

Figure 8:
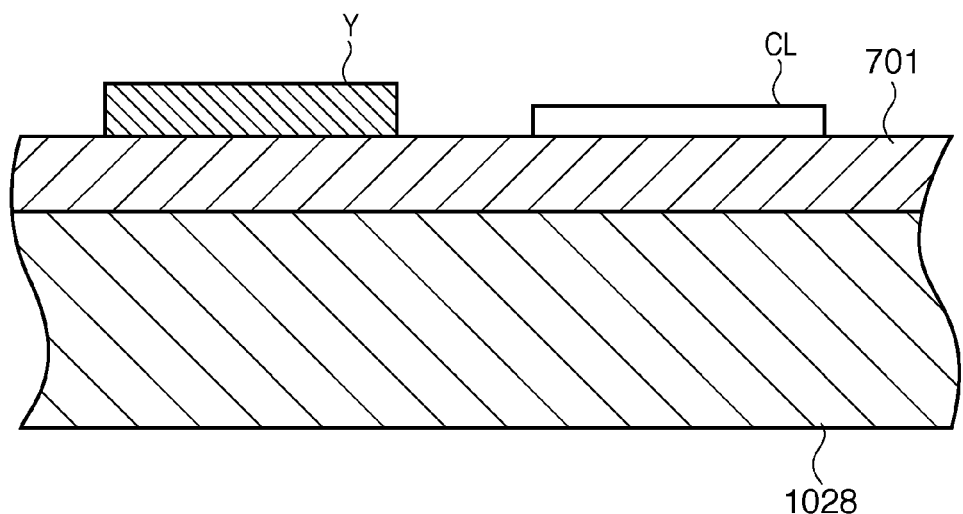
FIG. 8 is a sectional view schematically showing the section of a dot formed on a recording sheet.

FIG. 8 is a sectional view schematically showing the section of a dot formed on the recording sheet 1028. FIG. 8 shows Y and CL dots recorded on a receptive layer 701 of the recording sheet 1028.

The host computer 2000 estimates the relationship between the ink applying amount (tone value) and the thickness of the color material layer based on the height of the dot of each color material and the ink applying amount (tone value) (S103).

Figure 9:
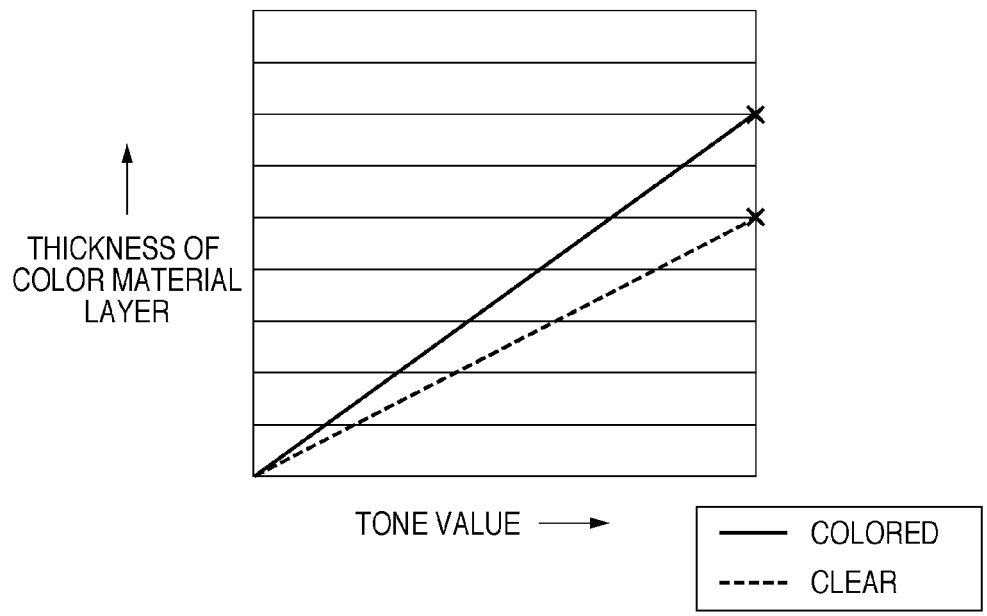
FIG. 9 is a graph showing the relationship between the applying amounts (tone values) of colored and CL inks and the average thickness of a color material layer.

FIG. 9 is a graph showing the relationship (to be referred to as a tone value-color material thickness characteristic) between the applying amounts (tone values) of colored and CL inks and the average thickness of the color material layer. When the ink applying amount is 0, the dot height is also 0. The origin of the graph is connected by a straight light to a measurement value (color material thickness) corresponding to a maximum tone value indicated by x. A color material thickness corresponding to the maximum tone value can be obtained by, for example, the following method.

The total volume of a dot formed with an ink on the sheet surface is obtained from the height of one dot measured in step S102 for each color material and the area (dot area) per dot. The total volume is divided by the dot area, attaining the average thickness of the color material layer. Note that an average dot area may be acquired in advance to use the dot area as a parameter in the calculation. Although the recording surface of the recording sheet 1028 is not completely smooth, the influence of smoothness can be minimized by acquiring the average thickness of a dot.

Figure 10:
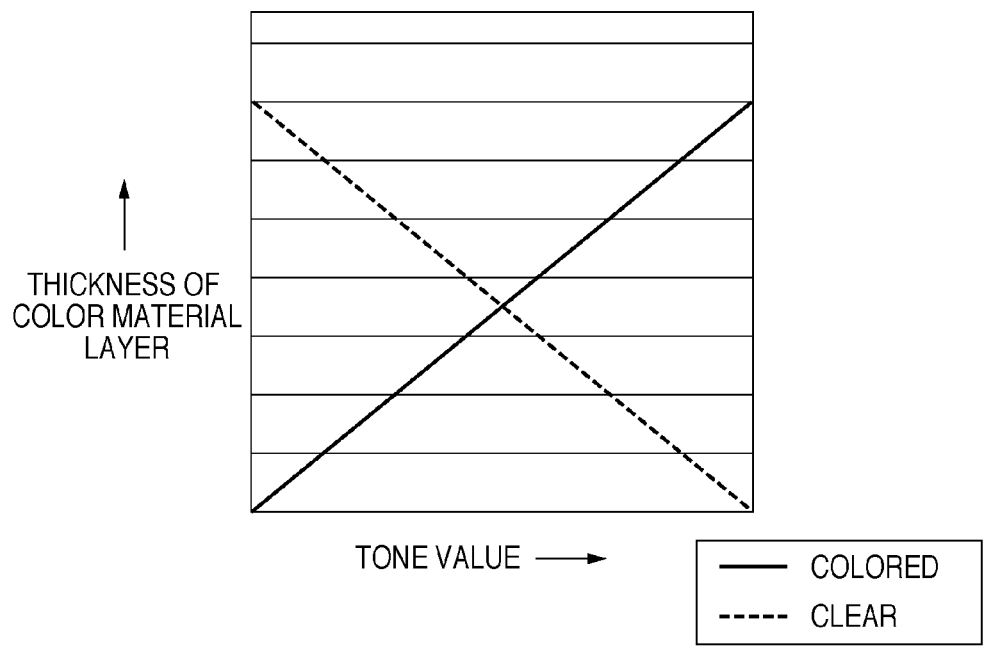
FIG. 10 is a graph for explaining how to superimpose the color material of the CL ink on that of the colored ink and make the thickness of the color material layer almost uniform.

Based on the tone value-color material thickness characteristic, the host computer 2000 determines the applying amount of CL ink with respect to the tone value of the colored ink when superimposing the color material of the CL ink on that of the colored ink, as shown in FIG. 10 (S104). More specifically, the applying amount of CL ink can be obtained by the following procedures.

First, a color material thickness when the colored ink takes a maximum tone value is obtained from the tone value-color material thickness characteristic. This color material thickness is set as the target value of the color material thickness when superimposing the color materials of the colored and CL inks at each tone level. The color material thickness of the colored ink at each tone level is obtained from the tone value-color material thickness characteristic. The applying amount of CL ink for the tone value is determined based on the tone value-color material thickness characteristic to compensate for a shortage of the thickness from the target color material thickness by the thickness of the color material of the CL ink.

Figure 11:
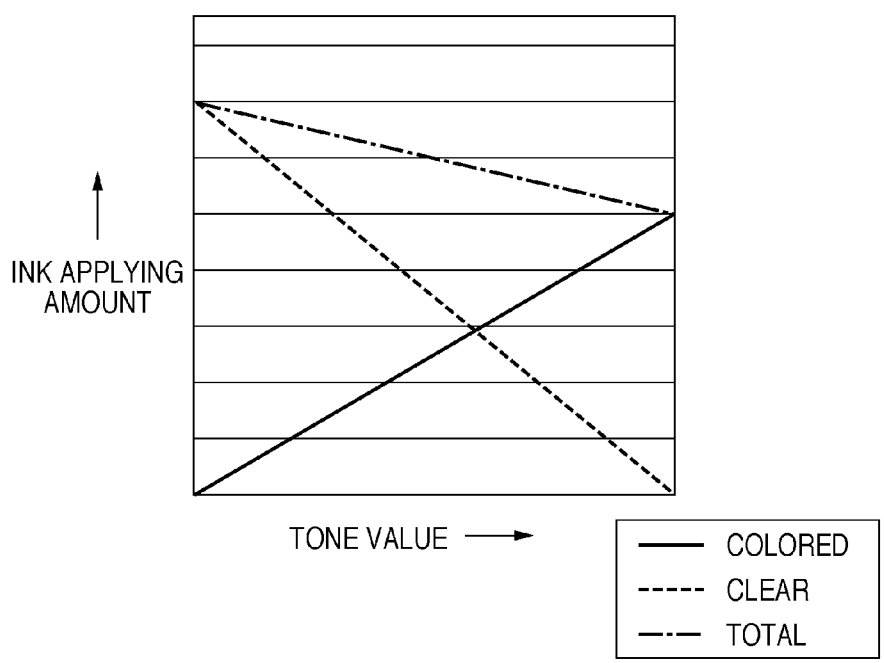
FIG. 11 is a graph for explaining a color separation table for the colored and CL inks.

Resultantly, a color separation table for the colored and CL inks shown in FIG. 11 can be generated to substantially uniform the thickness of the color material layer within the tone range (e.g., 0 to 255). The color separation table separates, for example, the R, G, and B values of image data into the C, M, Y, BK, and CL values of recording data corresponding to ink applying amounts.

Based on the generated color separation table, the host computer 2000 generates the relationship between image data (e.g., R, G, and B values) and recording data (multilevel) of the respective inks (S105). At this time, the host computer 2000 generates the relationship by taking account of general image processes such as color matching processing considering the gamut of an image input device and the color space of image data, and gamma conversion for correcting the gamma characteristic of the recording apparatus 400.

The host computer 2000 generates discharge data (binary halftone) based on the recording data (multilevel) of the respective inks, and generates a discharge table indicating the relationship between input image data and discharge data (S106). The host computer 2000 stores the discharge table in the memory 403 of the recording apparatus 400 (S107). The generating method in steps S106 and S107 suffices to generate discharge data from the recording data (multilevel) of the respective inks used in a general inkjet recording apparatus. For example, halftone data (binary) can be generated using various halftone methods such as error diffusion, dithering, and an index pattern method. Discharge data can be generated using a mask separation method using a pass mask.

After that, the recording apparatus 400 can record an image almost uniform in the thickness of the color material layer on the recording sheet 1028.

Figure 12:
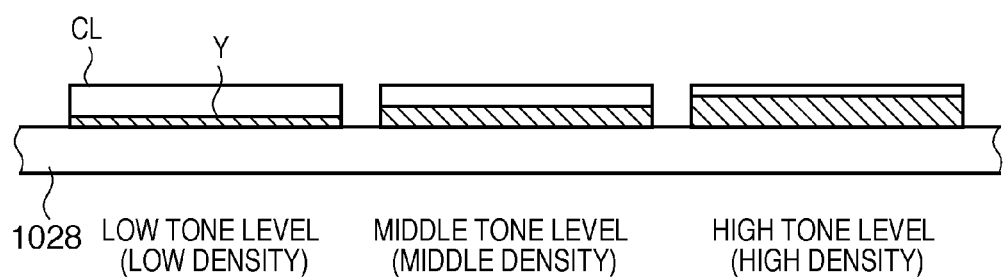
FIG. 12 is a sectional view for explaining the section of a dot recorded by a recording apparatus.

FIG. 12 is a sectional view for explaining the section of a dot recorded by the recording apparatus 400 in accordance with the discharge table generated by the above-described procedures. The CL color material having a thickness corresponding to the applying amount of Y ink overlaps the Y color material. The thicknesses of color material layers are almost equal at three tone levels of low, middle, and high densities.

FIG. 12 is a schematic view. In actual recording, the surface of the color material does not become completely flat and is slightly uneven. A purpose of the present invention is to minimize the difference in colorization of specular reflection light depending on the tone by substantially uniforming the thickness of a color material layer regardless of the tone value. Even if the surface of the color material is slightly uneven (in other words, the thickness of the color material layer is slightly nonuniform), it suffices to achieve this purpose.

FIGS. 13A to 13E are schematic views showing examples in which the thickness of a color material layer becomes almost uniform.

Figure 13A:
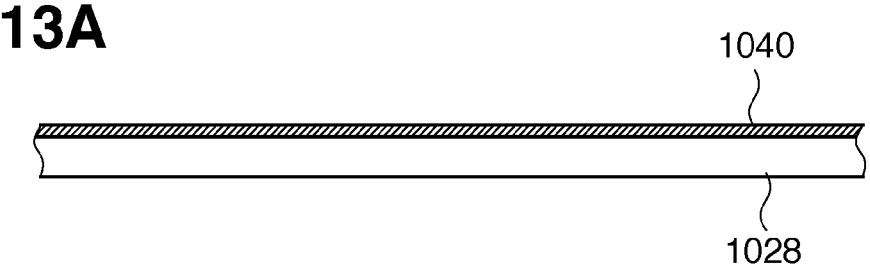
FIGS. 13A to 13E are schematic views showing examples in which the thickness of the color material layer becomes almost uniform.
Figure 13B:

FIG. 13A shows a case in which the thickness of a color material layer 1040 is ideally uniform. FIG. 13B shows a case in which the thickness of the color material layer 1040 changes depending on the position owing to a formed dot. The color material layer 1040 in FIG. 13B is almost equal in average thickness to the color material layer 1040 in FIG. 13A.

Figure 13C:
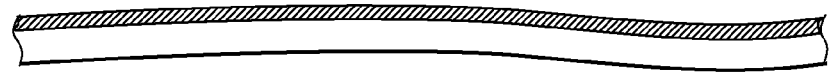
Figure 13D:
Figure 13E:

FIG. 13C shows a case in which the recording sheet 1028 is bent, and FIG. 13D shows a case in which the thickness of the recording sheet 1028 changes. FIG. 13E shows a case in which the thickness of the recording sheet 1028 changes and the thickness of the color material layer 1040 changes depending on the position.

In any cases shown in FIGS. 13A to 13E, the thickness of the ink layer can be regarded to be almost uniform though the thickness of the color material layer slightly varies, achieving the purpose of minimizing the difference in colorization of specular reflection light depending on the tone.

Note that the color material layer need not be a two-layered structure in which the color material layer of the CL ink is formed on that of a color ink. The color and CL inks may be mixed in the color material layer in a recording method of forming an image by dispersing dots of the color and CL inks in multipass recording.

[Confirmation of Effects]

Examination contents for confirming the effects of the embodiment and the results will be described.

Examination conditions are as follows:

recording apparatus: PIXUS Pro 9500 available from Canon colored ink: PGI-2Y (yellow) available from Canon CL ink: ink prepared by the same ink preparation method as that of PGI-2Y available from Canon but does not contain pigment particles recording medium: GL-101 available from Canon recorded image: tone patches 3×3 cm in size discharge table: color separation table (see FIG. 11) for uniforming the thickness of a color material layer measuring instrument: gonio-spectrophotometric color measurement system GCMS-4 available from MURAKAMI COLOR RESEARCH LABORATORY Under these conditions, tone patches 1 were formed with only a colored ink. Then, tone patches 2 were formed to uniform the thickness of the color material layer with colored and CL inks. The tristimulus values X, Y, and Z of specular reflection light (45°/45°) of a target tone patch were measured. The a* and b* components of the specular reflection light of the tone patch were calculated using the tristimulus values Xn, Yn, and Zn of specular reflection light of a white plate as a reference.

Figure 14:
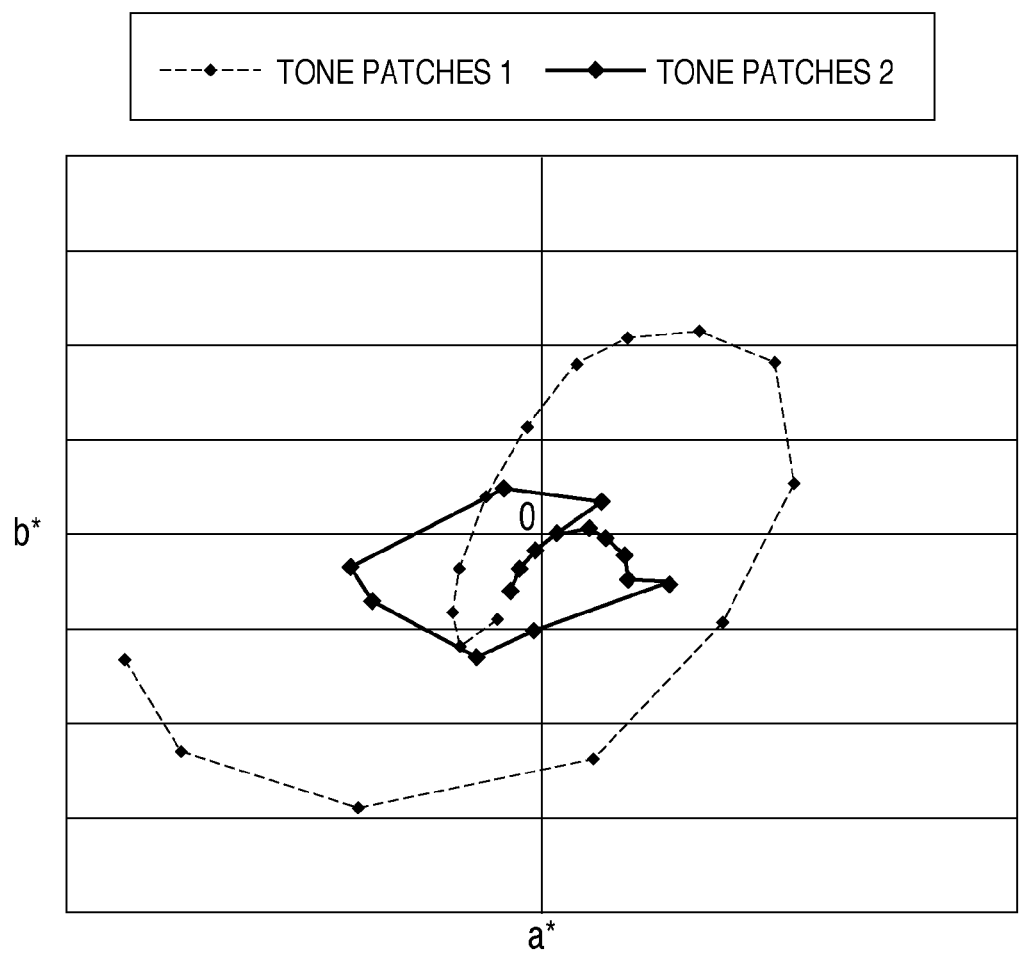
FIG. 14 is a graph showing measurement results for confirming the effects of the embodiment.

FIG. 14 is a graph showing the measurement results. A broken line indicates the measurement results of tone patches 1, and a solid line indicates those of tone patches 2. FIG. 14 shows that specular reflection light is colorized more strongly as the measurement result moves apart from the origin of the a* and b* axes.

The locus of tone patches 1 represents that specular reflection light is colorized slightly at low densities, but as the density increases, specular reflection light is colorized much more and the color changes more dynamically. In contrast, the locus of tone patches 2 means that the color changes but does not move greatly apart from the origin and specular reflection light is colorized slightly. That is, colorization in tone patches 2 is improved more than that in color patches 1.

This examination was made for yellow which stands out upon interference. As for the remaining colors, the difference in tone-dependent colorization of specular reflection light can be minimized by forming a color material layer at a uniform thickness, thereby suppressing a structural color.

Second Embodiment

Image formation according to the second embodiment of the present invention will be explained. In the second embodiment, the same reference numerals as those in the first embodiment denote the same parts, and a detailed description thereof will not be repeated.

In the first embodiment, the relationship between the ink applying amount and the thickness of the color material layer is obtained from the height of a dot at an ink applying amount corresponding to a known tone value. In the second embodiment, the relationship between the ink applying amount and the thickness of the color material layer at each tone level is obtained from a plurality of tone patches formed by changing the applying amounts of colored and CL inks.

Figure 15:
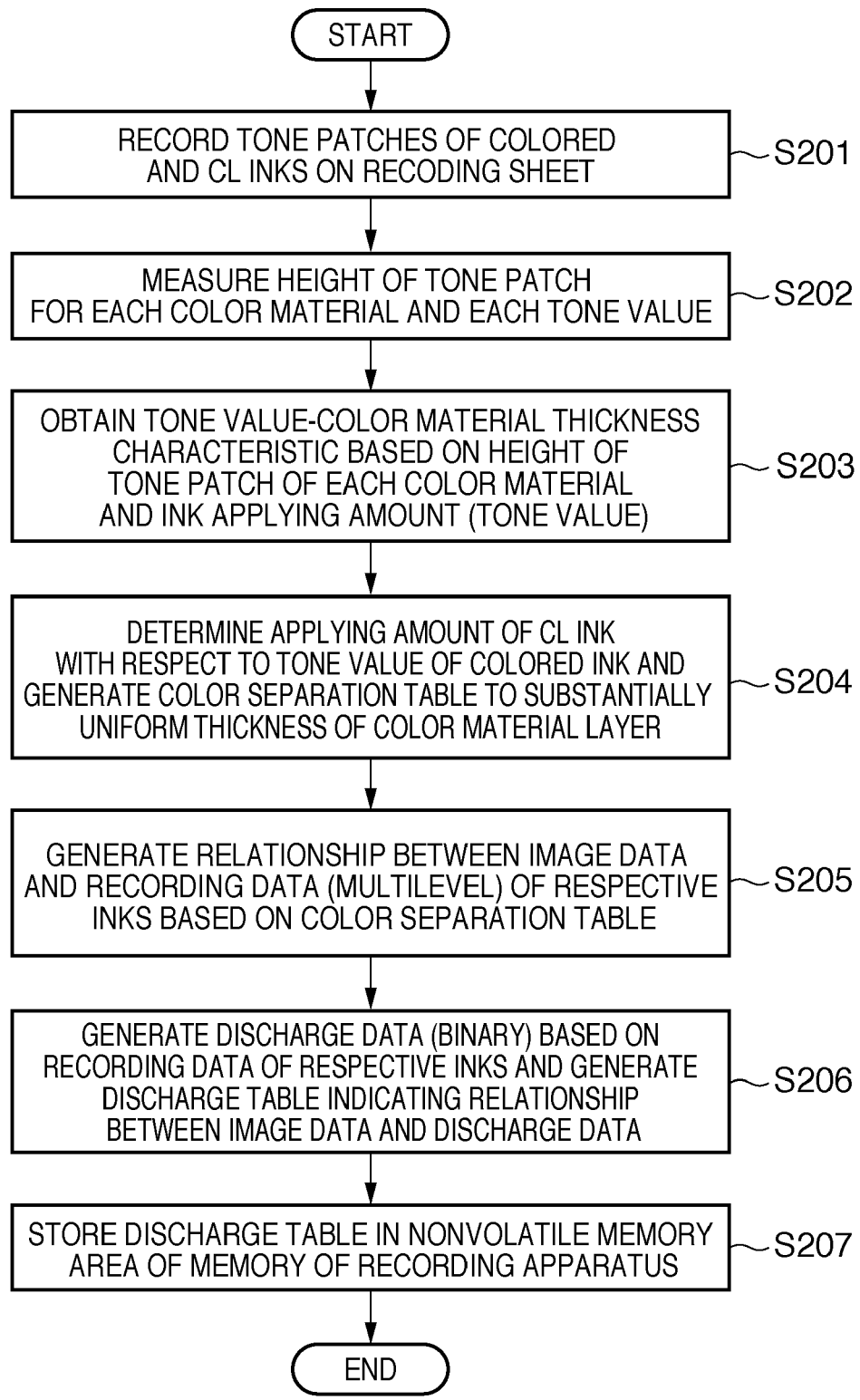
FIG. 15 is a flowchart for explaining procedures of generating a discharge table according to the second embodiment.

FIG. 15 is a flowchart for explaining procedures of generating a discharge table according to the second embodiment.

A host computer 2000 controls a recording apparatus 400 to form, on a recording sheet 1028, the tone patches of the colored and CL inks (S201).

Figures 16, 17:
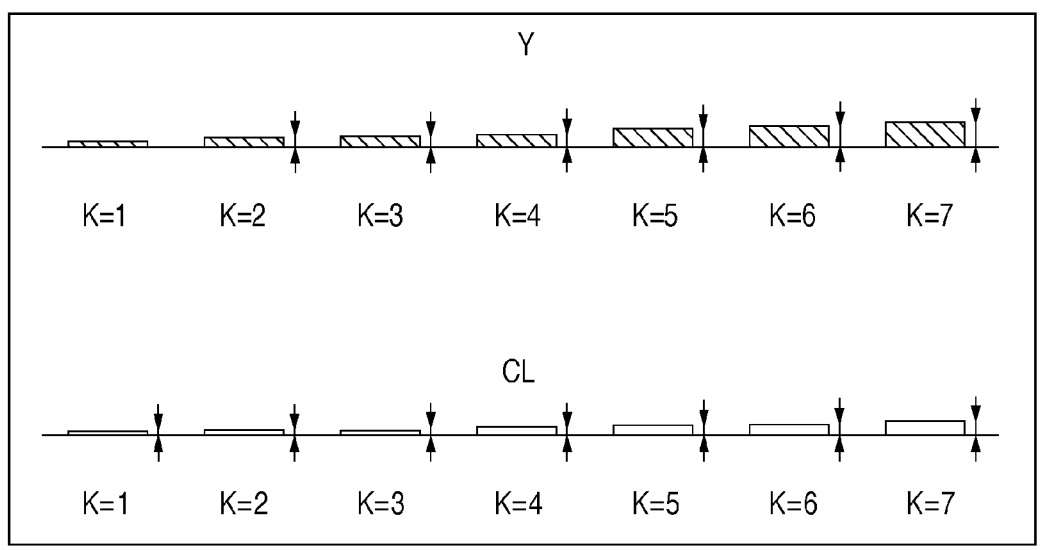
FIG. 16 is a view exemplifying tone patches formed with respective inks.
FIG. 17 is a sectional view schematically showing the section of a tone patch formed on a recording sheet.

FIG. 16 is a view exemplifying tone patches formed with the respective inks. When forming tone patches, a sufficient distance is ensured between tone patches so that the height of the tone patch (thickness of the color material layer) can be measured and tone patches do not contact each other. A plurality of tone patches (three in the example of FIG. 16) are formed to enhance the reliability of height measurement.

The host computer 2000 measures the height of a tone patch formed on the recording sheet 1028 for each color material and each tone level (S202).

FIG. 17 is a sectional view schematically showing the section of a tone patch formed on the recording sheet 1028.

The host computer 2000 obtains a tone value-color material thickness characteristic corresponding to FIG. 9 based on the height of the tone patch of each color material and the ink applying amount (tone value) (S203). At this time, the host computer 2000 calculates the thickness of the color material layer with respect to a tone value between tone patches by interpolation.

The host computer 2000 then determines the applying amount of CL ink with respect to the tone value of the colored ink to substantially uniform the thickness of the color material layer by superimposing the color material of the CL ink on that of the colored ink based on the tone value-color material thickness characteristic (S204). More specifically, the host computer 2000 can obtain the applying amount of CL ink by the following procedures.

First, a color material thickness when the colored ink takes a maximum tone value is obtained from the tone value-color material thickness characteristic. This color material thickness is set as the target value of the color material thickness when superimposing the color materials of the colored and CL inks at each tone level. The color material thickness of the colored ink at each tone level is obtained from the tone value-color material thickness characteristic. The applying amount of CL ink for the tone value is determined based on the tone value-color material thickness characteristic to compensate for a shortage of the thickness from the target color material thickness by the thickness of the color material of the CL ink. Resultantly, a color separation table (FIG. 11) for the colored and CL inks is generated.

Based on the generated color separation table, the host computer 2000 generates the relationship between image data (e.g., R, G, and B values) and recording data (multilevel) of the respective inks (S205). At this time, the host computer 2000 generates the relationship by taking account of general image processes such as color matching processing considering the gamut of an image input device and the color space of image data, and gamma conversion for correcting the gamma characteristic of the recording apparatus 400.

The host computer 2000 generates discharge data (binary) based on the recording data (multilevel) of the respective inks, and generates a discharge table indicating the relationship between image data input in each scanning of multipass recording, and discharge data (S206). The host computer 2000 stores the discharge table in a memory 403 of the recording apparatus 400 (S207). The generating method in steps S206 and S207 suffices to generate discharge data (binary) from the recording data (multilevel) of the respective inks used in a general inkjet recording apparatus. For example, halftone data (binary) can be generated using various halftone methods such as error diffusion, dithering, and an index pattern method. Discharge data can be generated using a mask separation method using a pass mask.

Thereafter, the recording apparatus 400 can record an image almost uniform in the thickness of the color material layer on the recording sheet 1028.

[Various Conditions]

The thickness of the color material layer, preparation of ink, and the recording head according to the present invention will be generally described.

Thickness of Color Material Layer

Setting of the substantially uniform thickness of the color material layer in the present invention will be explained.

In the set color material layer thickness range, a thickness at which the color material layer becomes thickest in each color patch recorded with only a colored ink is set as a minimum settable color material value. A color material thickness when the applying amount of clear ink is maximum without exceeding the total amount of applied color materials defined by a recording medium is set as a maximum settable thickness value of the color material layer.

However, the thickness of the color material layer need not always be almost uniform at all tone levels. It suffices to satisfy the conditions mentioned above at a tone level at which the difference in colorization of specular reflection light readily stands out, a solution of which is the purpose of the present invention. For example, colorization of specular reflection light is hardly noticeable for a dark color material such as black. Thus, the thickness of the color material layer need not always be uniform.

It is known that a change of the thickness of the color material layer leads to a change of the color of specular reflection light in accordance with the principle of interference by a thin film. A principal purpose of the present invention is to eliminate the difference in colorization of specular reflection light owing to the difference in tone. The foregoing method and apparatus can satisfactorily reduce the difference in colorization of specular reflection light. However, it is also possible to set the target thickness of the color material layer and control the thickness at each tone level so as to generate a specific color. In principle, the generated color is determined by the thickness and refractive index of the color material layer. The refractive index of the color material layer is measured, and the target thickness of the color material layer can be calculated based on the measured refractive index to attain a desired color. When the refractive index changes between ink colors or tone levels, the thicknesses of respective color material layers can be set to obtain a desired color between respective tone levels.

Pigment

The pigment of a pigment ink applied to the present invention is used at 1 to 20 wt %, and preferably 2 to 12 wt % of the total weight of pigment ink. Types of applicable pigments are listed below.

A black pigment is carbon black. For example, the carbon black is preferably prepared by the furnace process or channel process and has the following properties: a primary particle size of 15 to 40 nm, a specific surface area of 50 to 300 $m^2/g$ by BET, a DBP oil absorption of 40 to 150 ml/100 g, a volatile matter of 0.5 to 10%, and a pH value of 2 to 9. Examples of the commercially available carbon black having these properties are No. 2300, No. 900, MCF88, No. 33, No. 40, No. 45, No. 52, MA7, MA8, and No. 2200B (all of which are available from Mitsubishi Kasei Corporation), RAVEN 1255 (available from COLUMBIA CHEMICAL), REGAL 400R, REGAL 330R, REGAL 660R, and MOGUL L (all of which are available from CABOT), and Color Black FW1, Color Black FW18, Color Black 5170, Color Black 5150, Printex 35, and Printex U (all of which are available from Degussa).

Examples of a yellow pigment are C.I. Pigment Yellow 1, C.I. Pigment Yellow 2, C.I. Pigment Yellow 3, C.I. Pigment Yellow 13, C.I. Pigment Yellow 16, and C.I. Pigment Yellow 83.

Examples of a magenta pigment are C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112, and C.I. Pigment Red 122.

Examples of a cyan pigment are C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, and C.I. Vat Blue 6.

In addition, a newly produced pigment such as a self-dispersed type pigment is also usable.

A pigment dispersant is arbitrary as long as it is a water-soluble resin. The dispersant preferably has a weight-average molecular weight of 1,000 to 30,000, and more preferably, 3,000 to 15,000. Examples of such a dispersant are styrene, styrene derivatives, vinylnaphthalene, vinylnaphthalene derivatives, aliphatic alcohol esters of $\alpha,\beta$-ethylenically unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, and acrylamide; and a block copolymer, random copolymer, and graft copolymer each containing at least two monomers (at least one of them is a hydrophilic polymerizable monomer) selected from their derivatives, or salts of them. Natural resins such as rosin, shellac, and starch are also preferably available. These resins are soluble in a base-dissolved aqueous solution and are alkali soluble resins. Such a water-soluble resin used as a pigment dispersant is preferably contained in the range of 0.1 to 5 wt % of the total weight of pigment ink. The effects of the present invention are confirmed significantly at a smaller weight percentage with respect to the total weight of pigment ink.

In particular, a pigment ink containing the above-mentioned pigment is preferably adjusted to be neutral or alkaline totally. Such a pigment ink can improve the solubility of a water-soluble resin used as a pigment dispersant and provide a colored ink more excellent in long-term storage. However, such an ink may corrode various kinds of members used in an inkjet recording apparatus, and thus is preferably set to a pH range of 7 to 10. Examples of a pH adjustor used at this time are organic amines such as diethanolamine and triethanolamine, inorganic alkaline chemicals such as alkali metal hydroxides including sodium hydroxide, lithium hydroxide, and potassium hydroxide, an organic acid, and a mineral acid. The water-soluble resins listed above as a pigment and dispersant are dispersed or dissolved in an aqueous liquid medium.

Aqueous Liquid Medium

An aqueous liquid medium preferable for a pigment ink containing a pigment used in the present invention is a mixed solvent of water and a water-soluble organic solvent. Water is not general water containing various kinds of ions but ion-exchanged water (deionized water).

Examples of a water-soluble organic solvent for use upon mixed with water are alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols containing an alkylene group having 2 to 6 carbon atoms such as ethylene glycol, propylene glycol, butylene glycol, triethylene glycol, 1,2,6-hexantriol, thiodiglycol, hexylene glycol, and diethylene glycol; glycerin; lower alkyl ethers of polyalcohols such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinon. Of these water-soluble organic solvents, polyhydric alcohols such as diethylene glycol, and lower alkyl ethers of polyalcohols such as triethylene glycol monomethyl (or ethyl) ether are preferable.

The content of such a water-soluble organic solvent in the pigment ink is generally set to 3 to 50 wt %, and preferably 3 to 40 wt % of the total weight of pigment ink. The content of water used is set to 10 to 90 wt %, and preferably 30 to 80 wt % of the total weight of pigment ink.

If necessary, a surfactant, antifoaming agent, preservative, or the like can be properly added to a pigment ink applicable to the embodiments in addition to the above-mentioned components, in order to prepare a colored ink with a desired physical value. Especially, an appropriate amount of surfactant functioning as a penetrant needs to be added to make the liquid component of the pigment ink to quickly penetrate into a recording medium. The content of an additive is, for example, 0.05 to 10 wt %, and preferably 0.5 to 5 wt %. As an anionic surfactant, any general surfactant is preferably available, including a carboxylate type, sulfate type, sulfonate type, and phosphate type.

Method of Preparing Pigment Ink

As a pigment ink preparing method, a pigment is added to an aqueous medium containing at least a water-soluble resin serving as a dispersant and water, mixed, and stirred. Then, the resultant material is dispersed using a dispersion means (to be described later), and if necessary, centrifuged, obtaining a desired dispersion. A sizing material and an additive component properly selected from the listed ones are added to the dispersion, and the mixture is stirred, obtaining a pigment ink.

When an alkali-soluble resin mentioned above is used as the dispersant, a base needs to be added to dissolve the resin. Preferable examples of the base are organic amines such as monoethanolamine, diethanolamine, triethanolamine, aminmethyl propanol, and ammonia, and inorganic bases such as potassium hydroxide and sodium hydroxide.

In the pigment ink preparing method, it is effective to perform premixing for 30 min or more before stirring and dispersing a pigment-containing aqueous medium. The premixing treatment can preferably improve the wettability of the pigment surface and promote adsorption of the dispersant to the pigment surface.

The pigment dispersion treatment can use any general dispersion machine. For example, a ball mill, roll mill, or sand mill is available. Of these mills, a high-speed sand mill is preferably used. Examples of the high-speed sand mill are Super Mill, Sand Grinder, Beads Mill, Agitator Mill, Grain Mill, Dyno Mill, Pearl Mill, and Cobol Mill (all tradenames).

To prevent clogging of a recording element, an inkjet recording method with pigment ink uses a pigment having an optimum particle size distribution. The pigment having a desired particle size distribution can be attained by, for example, downsizing the grinding medium of the dispersion machine, increasing the filling factor of the grinding medium, prolonging the treatment time, decreasing the discharge speed, or classifying particles by a filter, centrifugal separator, or the like after grinding. Needless to say, these methods may be combined.

The clear ink can be formed from a combination of the foregoing materials. More specifically, the clear ink can be made from a combination except for pigment components. However, the clear ink is highly reactive and requires a special care against solidification in the ink tank. The influences of light and the drying temperature during storage in the tank need to be excluded.

Recording Head

The recording head adopted in the embodiments employs an arrangement in which droplets are formed and scattered using thermal energy to record an image. The typical arrangement and principle are disclosed in, for example, U.S. Pat. Nos. 4,723,129 and 4,740,796.

This method is applicable to both a so-called on-demand apparatus and continuous apparatus. Especially in the on-demand apparatus, at least one driving signal which corresponds to recording information and gives a rapid temperature rise exceeding film boiling is applied to an electrothermal transducer arranged in correspondence with a sheet or liquid channel in which a liquid (ink) is held. This signal causes the electrothermal transducer to generate thermal energy to generate film boiling on the heat acting surface of the recording head. As a result, a bubble is formed in the liquid (ink) in one-to-one correspondence with the driving signal. The growth and shrinkage of the bubble discharge the liquid (ink) via a discharge orifice, forming at least one droplet. When the driving signal is a pulse, a bubble grows and shrinks instantaneously at an appropriate timing to discharge the liquid (ink) with high response.

The pulse-like driving signal is preferably one disclosed in U.S. Pat. Nos. 4,463,359 or 4,345,262. Higher-quality recording can be achieved under conditions described in U.S. Pat. No. 4,313,124 regarding the invention of the temperature rise of the heat acting surface.

The recording head structure applicable to the present invention suffices to employ a structure (straight or right-angled liquid channel) as a combination of orifices, liquid channels, and electrothermal transducers disclosed in the foregoing references. The recording head preferably uses structures disclosed in U.S. Pat. Nos. 4,558,333 and 4,459,600 in which the heat acting portion is arranged in a bent region.

The recording head can also effectively use a structure (Japanese Patent Laid-Open No. 59-123670) in which a common slit serves as the discharge portions of electrothermal transducers, and a structure (Japanese Patent Laid-Open No. 59-138461) in which an opening for absorbing the pressure wave of thermal energy corresponds to a discharge portion.

The recording head can also use a piezoelectric element instead of thermal energy.

When a recording method other than the inkjet recording method employs multipass recording and the problem to be solved by the present invention arises, the present invention can be similarly applied to preferably control glossiness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-075144, filed Mar. 25, 2009, which is hereby incorporated by reference herein in its entirety.

The invention claimed is:

1. A method of generating a color separation table used by an image forming device that applies colored inks and an uncolored ink on a recording medium to form an image, the method comprising:
using a processor to perform the steps of:
acquiring a relationship between applying amounts of the colored inks and a thickness of a layer of a color material formed on a recording medium, and a relationship between an applying amount of the uncolored ink and the thickness of the layer of the color material formed on the recording medium;
determining, based on the relationships between the applying amounts and the thickness of the layer of the color material, the applying amounts of the colored inks and the applying amount of the uncolored ink to substantially uniform the thickness of the layer of the color material when forming an image on a recording medium; and
generating a color separation table for color-separating image data based on the applying amounts of the colored inks and the applying amount of the uncolored ink.

2. The method according to claim 1, wherein the relationships between the applying amounts and the thickness of the layer of the color material are estimated from heights of dots formed on the recording medium with the colored inks and a height of a dot formed with the uncolored ink.

3. The method according to claim 1, wherein the relationships between the applying amounts and the thickness of the layer of the color material are calculated from heights of a plurality of tone patches formed on the recording medium with the colored inks and heights of a plurality of tone patches formed with the uncolored ink.

4. The method according to claim 1, wherein the substantially uniform thickness of the layer of the color material is determined from a measurement result of a refractive index of the layer of the color material.

5. The method according to claim 1, wherein the image forming device forms an image by superimposing the uncolored ink on dots formed with the colored inks.

6. The method according to claim 1, further comprising generating, based on the color separation table, a discharge table which indicates a relationship between image data and an applying amount of ink and is to be set in the image forming device.

7. An apparatus for generating a color separation table used by an image forming device that applies colored inks and an uncolored ink on a recording medium to form an image, the apparatus comprising:
an acquisition section, configured to acquire a relationship between applying amounts of the colored inks and a thickness of a layer of a color material formed on a recording medium, and a relationship between an applying amount of the uncolored ink and the thickness of the layer of the color material formed on the recording medium;
a determiner, configured to determine, based on the relationships between the applying amounts and the thickness of the layer of the color material, the applying amounts of the colored inks and the applying amount of the uncolored ink to substantially uniform the thickness of the layer of the color material when forming an image on a recording medium; and
a generator, configured to generate a color separation table for color-separating image data based on the applying amounts of the colored inks and the applying amount of the uncolored ink.

8. An image forming apparatus for applying colored inks and an uncolored ink on a recoding medium to form an image, comprising:
a memory which stores a discharge table generated by a generating method defined in claim 6; and
a controller, configured to control applying amounts of the colored inks and an applying amount of the uncolored ink in accordance with input image data.

* * * * *